United States Patent
Roe et al.

(10) Patent No.: US 11,063,622 B2
(45) Date of Patent: Jul. 13, 2021

(54) VHF-UHF ANTENNA SYSTEM WITH FEEDBACK

(71) Applicant: AVX Antenna, Inc., San Diego, CA (US)

(72) Inventors: Michael Roe, San Diego, CA (US); Sebastian Rowson, San Diego, CA (US); Rowland Jones, Carlsbad, CA (US)

(73) Assignee: AVX ANTENNA, INC., San Diego, CA (US)

( * ) Notice: Subject to any disclaimer, the term of this patent is extended or adjusted under 35 U.S.C. 154(b) by 0 days.

(21) Appl. No.: 16/522,098

(22) Filed: Jul. 25, 2019

(65) Prior Publication Data

US 2020/0052731 A1 Feb. 13, 2020

Related U.S. Application Data

(60) Provisional application No. 62/715,998, filed on Aug. 8, 2018.

(51) Int. Cl.
| | |
|---|---|
| *H04B 1/18* | (2006.01) |
| *H04B 1/00* | (2006.01) |
| *H04N 5/00* | (2011.01) |
| *H04N 5/44* | (2011.01) |
| *H04N 21/482* | (2011.01) |

(52) U.S. Cl.
CPC .............. *H04B 1/18* (2013.01); *H04B 1/0064* (2013.01)

(58) Field of Classification Search
CPC .......... H04B 1/18; H04B 1/0064; H04B 1/44; H04B 7/08; H04B 1/48; H04B 17/02; H04B 1/06; H01Q 1/3275; H01Q 3/24
See application file for complete search history.

(56) References Cited

U.S. PATENT DOCUMENTS

| | | | | |
|---|---|---|---|---|
| 4,792,972 A | * | 12/1988 | Cook, Jr. .............. | H04N 7/162 380/241 |
| 5,159,707 A | * | 10/1992 | Mogi ................... | H04B 7/0814 455/134 |

(Continued)

FOREIGN PATENT DOCUMENTS

KR 10-2005-0080230 8/2005

OTHER PUBLICATIONS

PCT International Search Report and Written Opinion for corresponding PCT Application No. PCT/US2019/043417, dated Nov. 8, 2019, 11 pages.

(Continued)

*Primary Examiner* — Pablo N Tran
(74) *Attorney, Agent, or Firm* — Dority & Manning, P.A.

(57) ABSTRACT

An antenna system for use with one or more media devices is provided. The antenna system includes a plurality of antenna elements. Each antenna element is associated with an independent feed element. In addition each antenna element is configured to receive a plurality of radio frequency (RF) signals. Each RF signal can be associated with a UHF band or a VHF band. The antenna system can include at least one tuner and at least one switching device. The at least one switching device can be configured to selectively couple the at least one tuner to one antenna element of the plurality of antenna elements based, at least in part, on channel selection data associated with the at least one tuner.

19 Claims, 9 Drawing Sheets

(56) References Cited

U.S. PATENT DOCUMENTS

| | | | | |
|---|---|---|---|---|
| 5,313,660 | A * | 5/1994 | Lindenmeier | H04B 7/0814 348/729 |
| 5,949,498 | A * | 9/1999 | Rudolph | H04N 5/44 348/725 |
| 6,112,053 | A * | 8/2000 | Dunki-Jacobs | H04H 60/56 455/2.01 |
| 6,188,447 | B1 * | 2/2001 | Rudolph | H04N 5/44 348/729 |
| 6,577,353 | B1 * | 6/2003 | Welles, II | H04B 7/0871 348/705 |
| 7,034,898 | B1 * | 4/2006 | Zahm | H04B 7/082 348/725 |
| 7,084,808 | B2 * | 8/2006 | Ratzel | H04B 7/08 342/173 |
| 7,505,087 | B2 * | 3/2009 | Kang | H03J 1/0083 348/565 |
| 7,676,202 | B2 * | 3/2010 | Anton-Becker | H04B 7/082 455/133 |
| 7,701,515 | B2 * | 4/2010 | Gomez | H04N 5/46 348/731 |
| 7,936,852 | B2 * | 5/2011 | Lindenmeier | H04B 7/0814 375/347 |
| 8,055,227 | B2 * | 11/2011 | Arroyo | H04B 7/0871 455/132 |
| 8,060,910 | B2 * | 11/2011 | Cruz | H04N 21/4122 725/100 |
| 8,509,723 | B2 * | 8/2013 | Ghassemzadeh | H04B 7/0857 455/272 |
| 8,976,302 | B2 * | 3/2015 | Birkett | H04N 5/4401 348/180 |
| 9,369,755 | B2 * | 6/2016 | Gintis | H04N 5/775 |
| 9,479,837 | B1 * | 10/2016 | Rothaus | H04N 21/482 |
| 9,991,916 | B2 * | 6/2018 | Shimizu | H03J 1/005 |
| 2006/0025097 | A1 * | 2/2006 | Zahm | H01Q 1/3275 455/277.1 |
| 2006/0276149 | A1 * | 12/2006 | Womac | H04B 1/0064 455/133 |
| 2007/0004345 | A1 | 1/2007 | Ono et al. | |
| 2008/0119150 | A1 | 5/2008 | Su | |
| 2010/0074351 | A1 | 3/2010 | Ketchum et al. | |
| 2010/0105340 | A1 * | 4/2010 | Weissman | H04B 1/40 455/83 |
| 2010/0117913 | A1 | 5/2010 | Jung | |
| 2011/0179336 | A1 | 7/2011 | Gesbert et al. | |
| 2013/0135162 | A1 | 5/2013 | Shamblin et al. | |
| 2018/0131990 | A1 | 5/2018 | Desclos et al. | |
| 2018/0351253 | A1 | 12/2018 | Shamblin et al. | |
| 2020/0052727 | A1 * | 2/2020 | Roe | H04B 1/18 |

OTHER PUBLICATIONS

International Preliminary Report on Patentability for PCT/US2019/043417, dated Feb. 18, 2021, 8 pages.

International Preliminary Report on Patentability for PCT/US2019/043425 dated Feb. 18, 2021, 9 pages.

* cited by examiner

VHF-UHF ANTENNA SYSTEM WITH FEEDBACK

PRIORITY CLAIM

The present application claims the benefit of priority of U.S. Provisional App. No. 62/715,998, titled "VHF-UHF Antenna System with Feedback," having a filing date of Aug. 8, 2018, which is incorporated by reference herein.

FIELD

The present disclosure relates generally to antenna systems for use with media devices (e.g., television), for instance, in the VHF and/or UHF bands.

BACKGROUND

Antennas for television reception, otherwise known as over the air (OTA) antennas, are well known and routinely used to receive television broadcast signals. Televisions generally include a built-in tuner or an external tuner (e.g., set top box). The OTA antenna can be connected to the tuner (e.g., built-in or external). In some instances, the OTA antenna can be configured to amplify OTA signals. These OTA antennas are useful in settings where incoming signals require amplification.

Although cable television services have displaced the need for OTA antennas, consumers are now opting to replace cable television services with more cost-effective internet-based streaming services, such as Hulu and Netflix. However, one perceived disadvantage of internet-based streaming services is the inability to watch local programming (e.g., local news) provided by local broadcast stations. Since OTA antennas can receive OTA signals associated with local programming, consumers of internet-based streaming services are opting to invest in OTA antennas.

SUMMARY

Aspects and advantages of embodiments of the present disclosure will be set forth in part in the following description, or may be learned from the description, or may be learned through practice of the embodiments.

An example aspect of the present disclosure is directed to an antenna system for use with one or more media devices. The antenna system includes a plurality of antenna elements. Each antenna element is associated with an independent feed element. In addition each antenna element is configured to receive a plurality of radio frequency (RF) signals. Each RF signal can be associated with a UHF band or a VHF band. The antenna system can include at least one tuner and at least one switching device. The at least one switching device can be configured to selectively couple the at least one tuner to one antenna element of the plurality of antenna elements based, at least in part, on channel selection data associated with the at least one tuner.

Another example aspect of the present disclosure is directed to a method of configuring an antenna system for use with one or more media devices. The antenna system includes a plurality of antenna elements. Each of the plurality of antenna elements is configured to receive a plurality of RF signals in a UHF band or a VHF band. The method includes obtaining, by a controller of the antenna system, channel selection data associated with a first tuner of the antenna system. The channel selection data indicates selection of a first channel of a plurality of channels. The method further includes obtaining, by the controller, configuration data for the first tuner. The configuration data links each channel of the plurality of channels with an antenna element of the plurality of antenna elements. In addition, the method includes coupling, by the controller, one antenna element of the plurality of antenna elements to the first tuner based, at least in part, on the channel selection data and the configuration data.

Yet another example aspect of the present disclosure is directed to an antenna system. The antenna system includes a first antenna element having a first polarization. The first antenna element is configured to receive a radio frequency signal associated with a UHF band or a VHF band. The antenna system further includes a second antenna element having a second polarization that is different than the first polarization. The second antenna element is configured to receive a radio frequency signal associated with the UHF band or the VHF band. The antenna system includes a third antenna having a third polarization that is different than the first polarization and the second polarization. The third antenna element is configured to receive a radio frequency signal associated with the UHF band or the VHF band. The antenna system further includes a controller and at least two tuners. The controller is configured to selectively couple at least one of the first antenna element, the second antenna element, and the third antenna element to one of the at least two tuners based, at least in part, on channel selection data.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
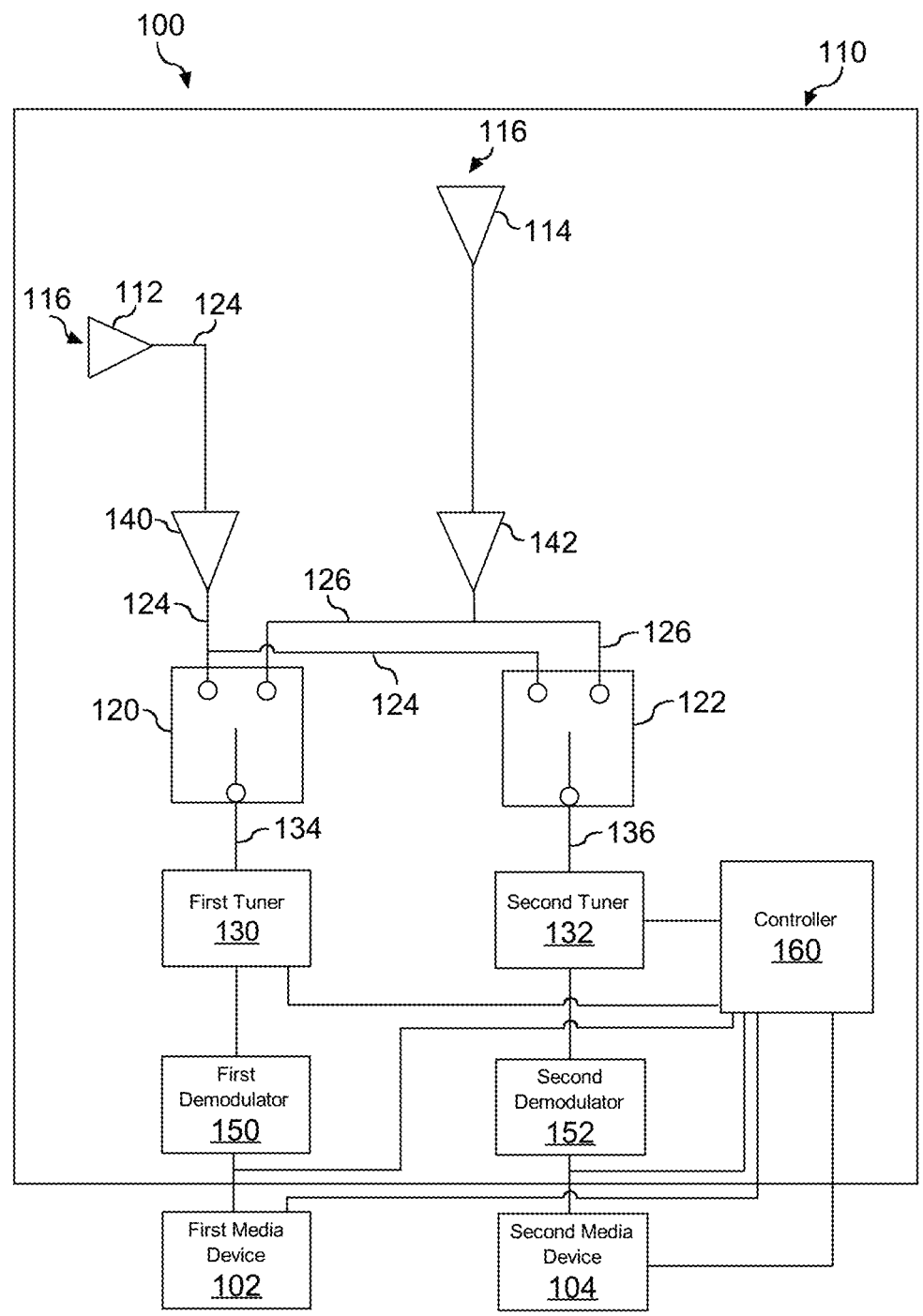
FIG. 1 depicts an antenna system according to example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to antenna systems for use with one or more media devices, such as a television. In some implementations, an antenna system according to example aspects the present disclosure can include a plurality of antenna elements. In some embodiments, each antenna element can be associated with a fixed radiation pattern and/or polarization. Each antenna element can be configured to receive an RF signal from each of a plurality of television stations. The RF signal can, for instance, be associated with content (e.g., local news) broadcast by a corresponding television station. In some implementations, one or more television stations can broadcast the RF signal via a UHF antenna. Alternatively, one or more television stations can broadcast the RF signal via a VHF antenna.

In some implementations, the antenna system can include at least one tuner that is in communication with the one or more media devices of the antenna system. The at least one tuner can be configured to select an RF signal provided from one of the plurality of televisions stations. The at least one tuner can be further configured to provide content (e.g., local news) associated with the RF signal to the one or more media devices. In this manner, the at least one tuner can select what content is displayed via the one or more media devices.

In some implementations, the antenna system can include at least one switching device. The at least one switching device can be movable between two or more positions to selectively couple the at least one tuner to one of the plurality of antenna elements. As will be discussed below in more detail, the at least one tuner can be coupled to one of the plurality of antenna elements based, at least in part, on channel selection data (e.g., selected channel) associated with the at least one tuner.

In some implementations, the antenna system can include a controller. The controller can be configured to control operation of the at least one switching device. For instance, the controller can be configured to couple the at least one tuner to one of the antenna elements based, at least in part, on the channel selection data and configuration data for the at least one tuner. As will be discussed below in more detail, the controller can be configured to implement a control routine (e.g., series of operations) to obtain the configuration data for the at least one tuner.

In some implementations, the controller can adjust (e.g., tune) the at least one tuner to a first channel of a plurality of channels. Each channel can correspond to the RF signal broadcast by each of the plurality of television stations. As such, the first channel can correspond to a RF signal broadcast by a first television station, whereas a second channel of the plurality of channels may correspond to a RF signal broadcast by a second television station. In this manner, the at least one tuner can be adjusted to select any one of the plurality of channels.

When the at least one tuner is adjusted to the first channel, the controller can provide one or more control actions associated with coupling the at least one tuner to each of the plurality of antenna elements via the at least one switching device. While the at least one tuner is coupled to a first antenna element of the antenna system, the controller can be configured to obtain a first set of metrics indicative of performance of the first antenna element. More specifically, the first set of metrics can be indicative of performance of the first antenna element while the at least one tuner is adjusted to the first channel.

After the controller obtains the first set of metrics, the controller can be configured to provide one or more control actions associated with decoupling the at least one tuner from the first antenna element. In this manner, the at least one tuner can no longer be coupled to the first antenna element. Additionally, the controller can be configured to provide one or more control actions associated with coupling the at least one tuner to a second antenna element of the antenna system. While the at least one tuner is coupled to the second antenna element, the controller can be configured to obtain a second set of metrics indicative of performance the second antenna element. More specifically, the second set of metrics can be indicative of performance of the second antenna element while the at least one tuner is adjusted to the first channel. After the controller obtains the second set of metrics, the controller can be configured to generate configuration data for the at least one tuner based, at least in part, on the first set of metrics and the second set of metrics.

In some implementations, the configuration data for the at least one tuner can link the first channel to one of plurality of antenna elements. For example, the configuration data can link the first channel to the first antenna element, because the first set of metrics are better compared to the metrics obtained for every other antenna element of the antenna system. In some implementations, the controller can be configured to store the configuration data. More specifically, the can be stored in the one or more memory devices associated with the controller.

The antenna systems according to the present disclosure provide numerous technical benefits. For instance, the at least one tuner of the antenna system can be selectively coupled to one of the antenna elements based on channel selection data and configuration data. In this manner, the at least one tuner can be coupled to an antenna element of the antenna system that provides optimal or near optimal performance while the at least one tuner is adjusted to a selected channel.

As used in the specification and the appended claims, the terms "first" and "second" may be used interchangeably to distinguish one component from another and are not intended to signify location or importance of the individual components. The singular forms "a", "an", and "the" include plural references unless the context clearly dictates otherwise. The use of the term "about" in conjunction with a numerical value is intended to refer to within ten percent (10%) of the stated numerical value.

Figure 2:
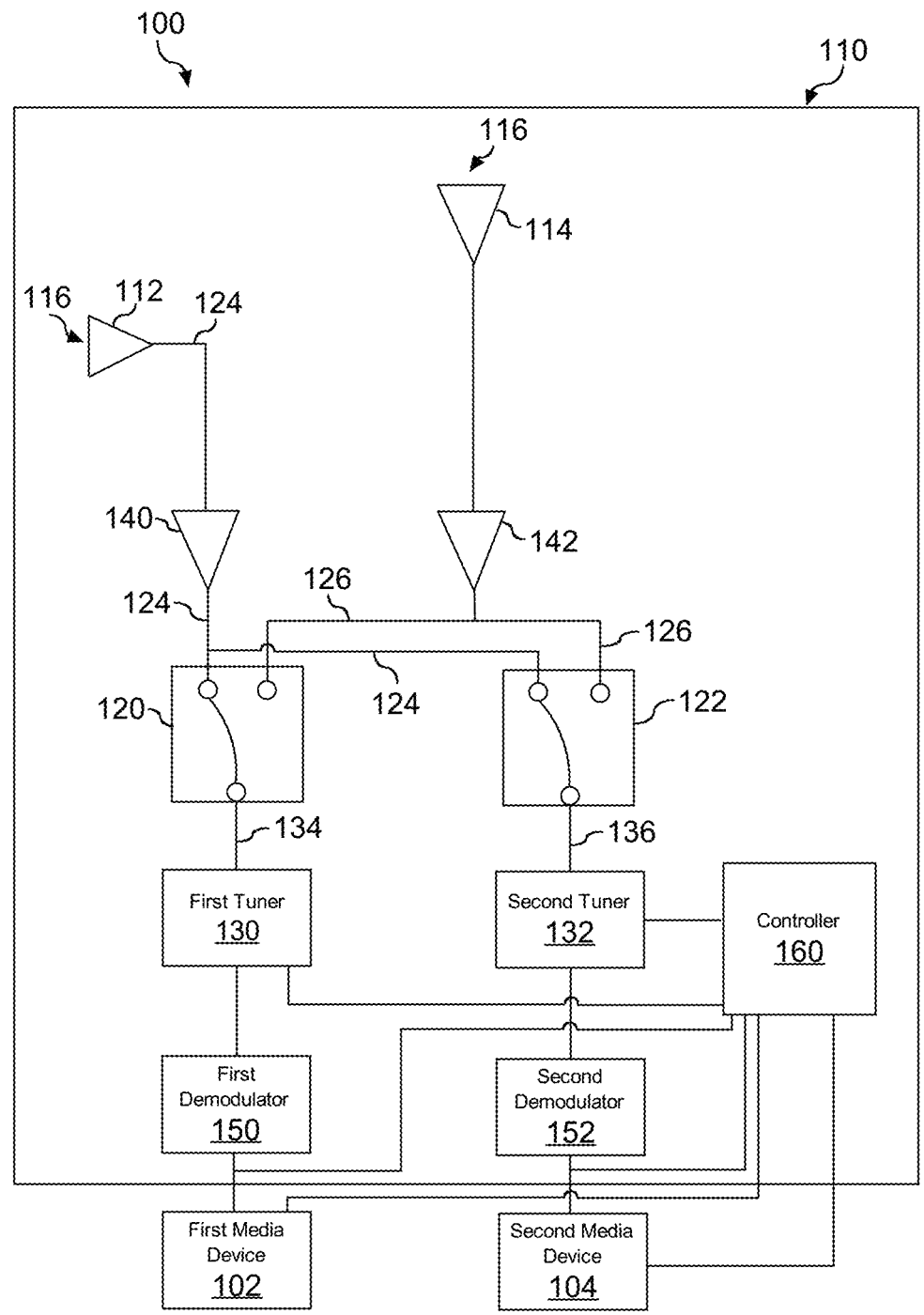
FIG. 2 depicts a switching device of the antenna system in a first position according to example embodiments of the present disclosure.
Figure 3:
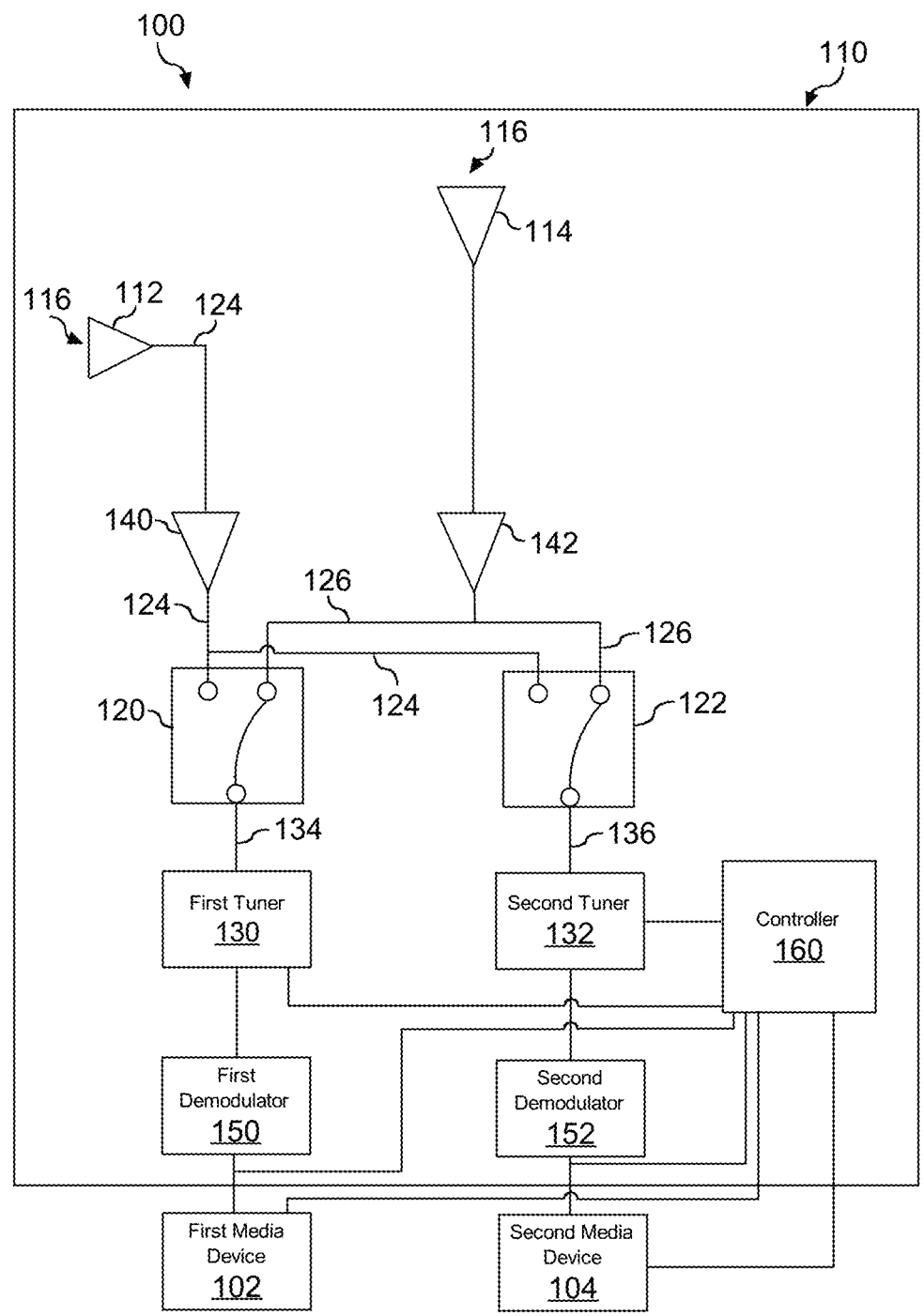
FIG. 3 depicts a switching device of the antenna system in a second position according to example embodiments of the present disclosure.

Referring now to the FIGS., FIGS. 1-3 depict a block diagram of an antenna system 100 for use with one or more media devices (e.g., televisions). As shown, the one or more media devices can include a first media device 102 and a second media device 104. It should be appreciated, however, that the antenna system 100 can be used with more or fewer media devices. As shown, the antenna system 100 can include a first antenna element 112 and a second antenna element 114. It should be appreciated, however, that the antenna system 100 can include more than two antenna elements. In some embodiments, each antenna element (e.g., the first antenna element 112 and the second antenna element 114) can be associated with a fixed radiation pattern and/or polarization.

In example embodiments, an antenna polarization of the first antenna element 112 can be different than an antenna polarization of the second antenna element 114. For instance, the first antenna element 112 can have a horizontal antenna polarization. Alternatively and/or additionally, the second antenna element 114 can have a vertical antenna polarization. It should be appreciated, however, that the first antenna element 112 and the second antenna element 114 can have any suitable antenna polarization. It should also be appreciated that the first antenna element 112 and the second antenna element 114 can each be associated with an independent RF feed. For instance, the first antenna element 112 can associated with a first RF feed, whereas the second antenna element 114 can be associated with a second RF feed that is different than the first RF feed.

In some implementations, the first antenna element 112 and the second antenna element 114 can each be configured to receive a radio frequency (RF) signal 116 provided from each of a plurality of television stations. The RF signal 116 can, for instance, be associated with content (e.g., local news) broadcast by a corresponding television station.

In some implementations, a frequency associated with each of the plurality of RF signals 116 can be within a UHF band. More specifically, the UHF band can span from about 300 Megahertz (MHz) to about 3 Gigahertz (GHz). Alternatively, the frequency associated with each of the plurality of RF signals 116 can be within a VHF band. More specifically, the VHF band can span from about 30 MHz to about 300 MHz. It should be appreciated, however, that the frequency associated with each RF signal of the plurality of RF signals 116 can be within any suitable band of frequencies.

As shown, the antenna system 100 can include a first switching device 120 and a second switching device 122. It should be appreciated, however, that the antenna system 100 can include more or fewer switching devices. As shown, the first switching device 120 can be coupled to the first antenna element 112 and the second antenna element 114 via a first conductor 124 and a second conductor 126, respectively. Additionally, the second switching device 122 can be coupled to the first antenna element 112 and the second antenna element 114 via the first conductor 124 and the second conductor 126, respectively.

In example embodiments, the antenna system 100 can include a first tuner 130 and a second tuner 132. It should be appreciated, however, that the antenna system 100 can include more or fewer tuners. In some implementations, the first tuner 130 and the second tuner 132 can be disposed on the same printed circuit board. In alternative implementations, the first tuner 130 and the second tuner 132 can be disposed on separate printed circuit boards. As shown, the first tuner 130 can be coupled to the first switching device 120 via a third conductor 134. Additionally, the second tuner 132 can be coupled to the second switching device 122 via a fourth conductor 136. In some implmentations, the tuners 130, 132 and the antenna elements 112, 114 can, as shown, be disposed within a singular package 110 of the antenna system 100.

The first tuner 130 and the second tuner 132 can each be tuned to a frequency channel corresponding to one or more RF signals of the plurality RF signals 116. In some implementations, the first tuner 130 is couplable to the first media device 102 via any suitable wired or wireless communication link. In this manner, the first tuner 130 can be tuned to one of a plurality of frequency channels to provide the first media device 102 content (e.g., local news) associated with the selected frequency channel. Additionally, the second tuner 132 is couplable to the second media device 104 via any suitable wired or wireless communication link. In this manner, the second tuner 132 can be tuned to one of the plurality of frequency channels to provide the second media device 104 content associated with the selected frequency channel. As will be discussed below in more detail, the first tuner 130 can be selectively coupled to one of the first antenna element 112 and the second antenna element 114 via the first switching device 120. Additionally, the second tuner 132 can be selectively coupled to one of the first antenna element 112 and the second antenna element 114 via the second switching device 122.

When the first switching device 120 is configured in a first state (FIG. 2), the first tuner 130 can be coupled to the first antenna element 112. In this manner, the plurality of RF signals 116 received at the first antenna element 112 can be provided to the first tuner 130 via the first switching device 120. When the first switching device 120 is configured in a second state (FIG. 3), the first tuner 130 can be coupled to the second antenna element 114. In this manner, the plurality of RF signals 116 received at the second antenna element 114 can be provided to the first tuner 130 via the first switching device 120.

In some implementations, the first tuner 130 may tuned to a first channel of a plurality of channels. In this manner, the first tuner 130 can be configured to process one or more RF signals corresponding to the first channel to obtain one or more metrics indicative of performance of the antenna element (e.g., first antenna element 112 or second antenna element 114) to which the first tuner 130 is coupled. Examples of the one or more metrics can include, without limitation, received signals strength indicator (RSSI), signal to noise ratio (SNR), signal-to-interference-plus-noise ratio (SINR), magnitude error ratio (MER), error vector magnitude (EVM), bit error rate (BER), block error rate (BLER), or packet error rate (PER), or other metrics known in the art.

When the second switching device 122 is configured in a first state (FIG. 2), the second tuner 132 can be coupled to the first antenna element 112 via the second switching device 122. In this manner, the plurality of RF signals 116 received at the first antenna element 112 can be provided to the second tuner 132. When the second switching device 122 is in a second state (FIG. 3), the second tuner 132 can be coupled to the second antenna element 114 via the second switching device 122. In this manner, the plurality of RF signals 116 received at the second antenna element 114 can be provided to the second tuner 132 via the second switching device 122.

In some implementations, the second tuner 132 can be tuned to a second channel of the plurality of channels. In this manner, the second tuner 132 can be configured to process one or more RF signals corresponding to the second channel to obtain one or more metrics indicative of performance of the antenna element (e.g., first antenna element 112 or second antenna element 114) to which the second tuner 132 is coupled.

In example embodiments, the antenna system 100 can include a first low noise amplifier 140 and a second low noise amplifier 142. It should be appreciated, that the antenna system 100 can include more or fewer low noise amplifiers. As shown, the first low noise amplifier 140 can be coupled between the switching devices 120, 122 and the antenna element 112, 114. In this manner, the first low noise amplifier 140 can amplify RF signals 116 received at the first antenna element 112 and the second antenna element 114, respectively. Additionally, the second low noise amplifier 142 can be coupled between the switching devices 120, 122 and the antenna elements 112, 114. In this manner, the second low noise amplifier 142 can amplify RF signals 116 received at the first antenna element 112 and second antenna element 114, respectively.

In example embodiments, the antenna system 100 can include a first demodulator 150 and a second demodulator 152. It should be appreciated, however, that the antenna system 100 can include more or fewer demodulators. As shown, the first demodulator 150 can be in communication with the first tuner 130. In example embodiments, the first demodulator 150 can be configured to demodulate one or more signals received from the first tuner 130. In this manner, the first demodulator 150 can extract data from the one or more signals received from the first tuner 130. More specifically, the first demodulator 150 can extract data indicative of content (e.g., sports, news, sitcoms, etc.) provided by the corresponding television station. It should be appreciated that the first demodulator 150 can be coupled to the first media device 102. In this manner, the data can be provided to the first media device 102.

As shown, the second demodulator 152 can be in communication with the second tuner 132. In example embodiments, the second demodulator 152 can be configured to demodulate one or more signals received from the second tuner 132. In some implementations, the second demodulator 152 can extract data indicative of content (e.g., sports, news, sitcoms, etc.) associated with whatever frequency channel the second tuner 132 is tuned to. It should be appreciated that the second demodulator 152 can be coupled to the second media device 104. In this manner, the data can be provided to the second media device 104.

Figure 4:
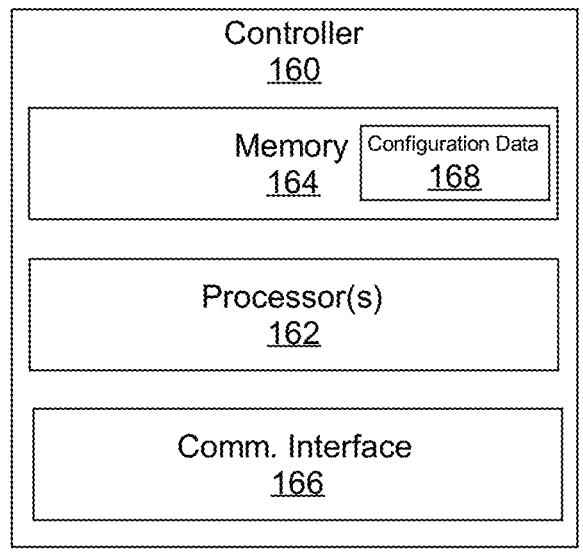
FIG. 4 depicts a block diagram of a controller of the antenna system according to example embodiments of the present disclosure.

In some implementations, the antenna system 100 can include a controller 160 configured to control operation of the first switching device 120 to selectively couple the first tuner 130 to one of the first antenna element 112 and the second antenna element 114. Additionally, the controller 160 can be configured to control operation of the second switching device 122 to selectively couple the second tuner 132 to one of the first antenna element 112 and the second antenna element 114. It should be appreciated that the controller 160 can correspond to any suitable processor-based device, including one or more computing devices. For instance, FIG. 4 illustrates one embodiment of suitable components that may be included within the controller 160. As shown in FIG. 4, the controller 160 can include a processor 162 and associated memory 164 configured to perform a variety of computer-implemented functions (e.g., performing the methods, steps, calculations and the like disclosed herein). As used herein, the term "processor" refers not only to integrated circuits referred to in the art as being included in a computer, but also refers to a controller, microcontroller, a microcomputer, a programmable logic controller (PLC), an application specific integrated circuit (ASIC), a Field Programmable Gate Array (FPGA), and other programmable circuits. Additionally, the memory 164 can include memory elements including, but not limited to, computer readable medium (e.g., random access memory (RAM)), computer readable non-volatile medium (e.g., flash memory), and/or other suitable memory elements or combinations thereof.

Additionally, as shown in FIG. 4, the controller 160 can include a communication interface 166. In some implementations, the communications interface 166 can include associated electronic circuitry that is used to send and receive data. As such, the communication interface 166 of the controller 160 can be used to communication with at least one of the tuners (e.g., first tuner 130 and second tuner 132), the demodulators (e.g., first demodulator 150 and second demodulator 152), and/or the media devices (e.g., first media device 102 and second media device 104). In this manner, the controller 160 can receive one or more signals (e.g., output) from the tuners 130 and 132, the demodulators 150 and 152, the media devices 102 and 104, or any combination thereof. In addition, the communications interface 166 can be used to provide command signals to the switching devices (e.g., the first switching device 120 and the second switching device 122). In this manner, the controller 160 can control operation of the first switching device 120 to selectively couple the first tuner 130 to one of the first antenna element 112 and the second antenna element 114. Additionally, the controller 160 can control operation of the second switching device 122 to selectively couple the second tuner 132 to one of the first antenna element 112 and the second antenna element 114.

As will be discussed below in more detail, the controller 160 can be configured to implement a control routine (e.g., series of operations) to obtain configuration data 168 (e.g., a lookup table) for the first tuner 130 and/or the second tuner 132. As shown, the configuration data 168 can be stored in the one or more memory devices 164 associated with the controller 160. In some implementations, the configuration data 168 can include a first set of configuration data and a second set of configuration data. More specifically, the first set of configuration data can be associated with the first tuner 130, and the second set of configuration data can be associated with the second tuner 132.

In some implementations, the controller 160 can be configured to implement the control routine once when the antenna system 100 is initially installed. In alternative implementations, the controller 160 can be configured to implement the control routine in response to detecting occurrence of a detected event. For instance, the detected event can occur when user-input is received via an input device. More specifically, the input device can include one or more mechanical interface elements (e.g., push-button) in operative communication with the controller. Alternatively or additionally, the input device can include a mobile device (e.g., smartphone, tablet, laptop, etc.) that is communicatively coupled to the controller via any suitable wired or wireless communication link.

An illustrated in the below Table, the configuration data 168 for the first tuner 130 can link each channel of a plurality of channels with one of the first antenna element 112 and the second antenna element 114. Additionally, the configuration data 168 for the second tuner 132 can link each channel of the plurality of channels with one of the first antenna element 112 and the second antenna element 114.

| Channel | First Tuner | Second Tuner |
| --- | --- | --- |
| 1 | First Antenna | First Antenna |
| 2 | First Antenna | Second Antenna |
| 3 | Second Antenna | First Antenna |
| 4 | Second Antenna | Second Antenna |

In some implementations, the configuration data 168 for the first tuner 130 may be the same as the configuration data 168 for the second tuner 132. For instance, the configuration data 168 for the first tuner 130 and the configuration data 168 for the second tuner 132 may each link a first channel (e.g., channel 1) of the plurality of channels with the first antenna element 112. In some implementations, however, the configuration data 168 for the first tuner 130 may be different than the configuration data 168 for the second tuner 132. For instance, the configuration data 168 for the first tuner 130 may link a first channel (e.g., channel 1) of the plurality of channels with the first antenna element 112. In this manner, the controller 160 can be configured to couple the first tuner 130 to the first antenna element 112 when channel selection data associated with the first tuner 130 indicates selection of the first channel (e.g., channel 1). In contrast, the configuration data 168 for the second tuner 132 may link the first channel with the second antenna element 114. In this manner, the controller 160 can be configured to couple the second tuner 132 to the second antenna element 114 when channel selection data associated with the second tuner 132 indicates selection of the first channel.

In some implementations, the first tuner 130 and the second tuner 132 may be tuned to different channels. For instance, the first tuner 130 can be tuned to the first channel, whereas the second tuner 132 can be tuned to the second channel. In such implementations, the first tuner 130 and the second tuner 132 may, based on the configuration data 168, coupled to different antenna elements. For instance, the first tuner 130 can be coupled to the first antenna element 112. In contrast, the second tuner 132 can be coupled to the second antenna element 114. In this manner, the antenna system 100 of the present disclosure can provide optimal or near optimal performance across multiple media devices.

Figure 5:
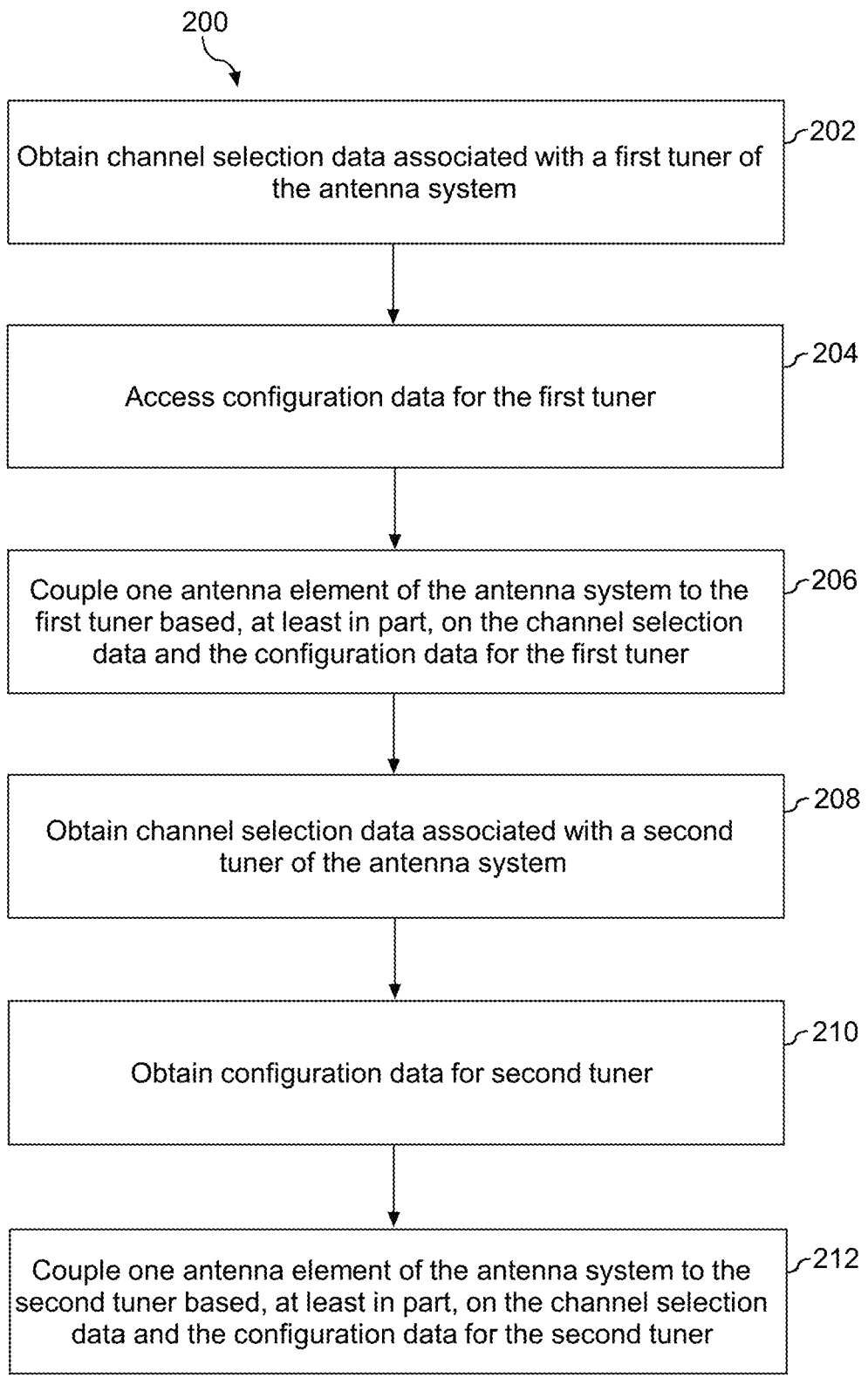
FIG. 5 depicts a flow diagram of a method for configuring antenna system for use with a media device according to example embodiments of the present disclosure.

Referring now to FIG. 5, a flow diagram of a method 200 for configuring an antenna system for use with one or more media devices is provided according to example embodiments of the present disclosure. The method 200 may be implemented, using, for instance, the active antenna system discussed above with reference to FIG. 1. FIG. 5 depicts steps performed in a particular order for purposes of illustration and discussion. Those of ordinary skill in the art, using the disclosures provided herein, will understand that various steps of the method 200 may be adapted, modified, rearranged, performed simultaneously or modified in various ways without deviating from the scope of the present disclosure.

At (202), the method 200 includes obtaining, by a controller of the antenna system, channel selection data associated with a first tuner of the antenna system. At (204), the method 200 includes obtaining configuration data for the first tuner. At (206), the method 200 can include coupling one antenna element (e.g., first antenna element or second antenna element) of the antenna system to the first tuner. More specifically, the controller can be configured to couple the one antenna element to the first tuner based, at least in part, on the channel selection data and the configuration data. In example embodiments, the channel selection data can indicate selection of a first channel of a plurality of channels. Additionally, the configuration data can link the first channel with the first antenna element. In this manner, the controller can be configured to couple the first antenna element to the first tuner based, at least in part, on the channel selection data and the configuration data.

At (208), the method 200 can include obtaining channel selection data associated with a second tuner of the antenna system. At (210), the method 200 includes obtaining configuration data for the second tuner. At (212), the method 200 includes coupling one antenna element (e.g., first antenna element or second antenna element) of the antenna system to the first tuner. More specifically, the controller can be configured to couple the one antenna element to the first tuner based, at least in part, on the channel selection data and the configuration data In example embodiments, the configuration data obtained at (204) and (210) for the first tuner and the second tuner, respectively can be stored in one or more memory devices associated with a controller of the antenna system. In this manner, the controller can access (e.g., read) the configuration data from the one or more memory devices. It should be appreciated that, in some embodiments, configuration data for the first tuner may not exist. In such embodiments, the controller can, as will be discussed below in more detail, be configured to generate the configuration data.

Figure 6:
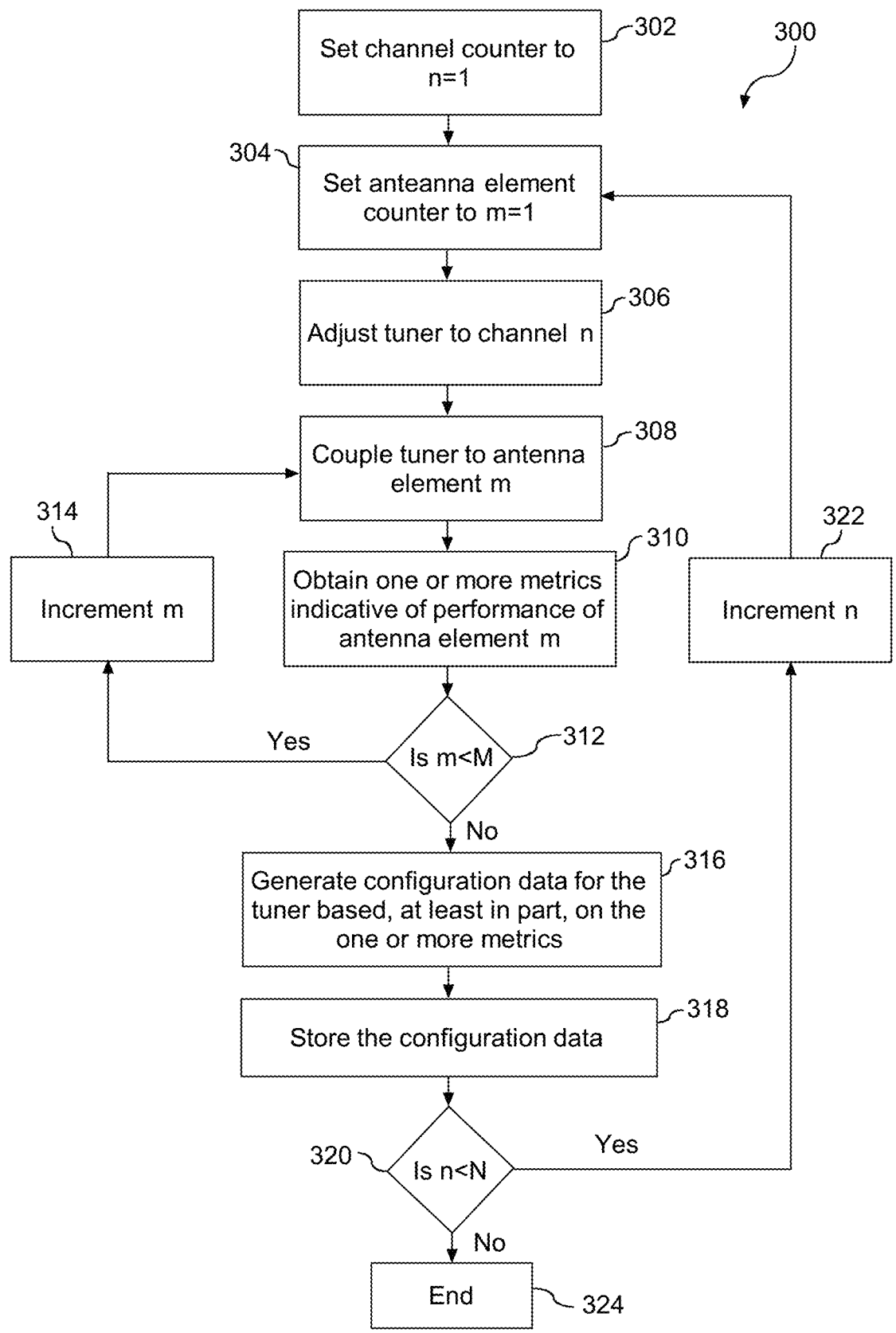
FIG. 6 depicts a flow diagram of a method for determining configuration data for a tuner of the antenna system according to example embodiments of the present disclosure.

Referring briefly now to FIG. 6, a flow diagram of a method 300 for obtaining configuration data is provided according to example embodiments of the present disclosure. The method 300 may be implemented, using, for instance, the active antenna system discussed above with reference to FIG. 1. Those of ordinary skill in the art, using the disclosures provided herein, will understand that various steps of the method 300 may be adapted, modified, rearranged, performed simultaneously or modified in various ways without deviating from the scope of the present disclosure.

At (302), the method 300 includes assigning an initial value to a channel counter variable, n. In example embodiments, the controller of the antenna system can be configured to assign the channel counter variable an initial value of one. It should be appreciated, however, that the channel counter variable can be initialized to any suitable numerical value. For instance, in some implementations, the channel counter variable can be assigned an initial value of zero.

At (304), the method 300 includes assigning an initial value to an antenna element counter variable, m. In example embodiments, the controller of the antenna system can be configured to assign the antenna element counter variable an initial value of one. It should be appreciated, however, that the antenna element counter variable can be assigned any suitable numerical value. For instance, in some implementations, the antenna element counter can be assigned an initial value of zero.

At (306), the method 300 includes adjusting the tuner (e.g., first tuner, second tuner, etc.) to a channel that corresponds to the present value of the channel counter variable. For example, if the present value of the channel counter variable is n=1, then the tuner will be adjusted to a first channel of the plurality of channels. In example embodiments, the controller can be configured to adjust the tuner to the channel that corresponds to the present value of the channel counter variable.

At (308), the method 300 includes coupling the tuner to an antenna element that corresponds to the present value of the antenna element counter variable. For example if the present value of the antenna element counter variable is m=1, then the tuner will be coupled to a first antenna element of the plurality of antenna elements. Alternatively, if the present value of the antenna element counter variable is m=2, then the tuner will be coupled to a second antenna element of the plurality of antenna elements. In example embodiments, the controller can be configured to couple the tuner to the antenna element that corresponds to the present value of the antenna element counter variable.

At (310), the method 300 includes obtaining one or more metrics while the tuner is coupled to the antenna element. In example embodiments, the one or more metrics can be indicative of performance of the antenna element while the tuner is tuned to the present channel. More specifically, the one or more metrics can include a receive signal strength indicator (RSSI) value associated with the RF signal received at the antenna element. It should be appreciated that the one or more metrics can include any suitable data indicative of performance of the antenna element.

At (312), the method 300 includes comparing the present value of the antenna element counter variable (m) against a total number of antenna elements (M) included in the antenna system. For instance, if the present value of the antenna element counter variable is less than the total number of antenna elements, then the method proceeds to (314). Otherwise, the method 300 proceeds to (316).

At (314), the method 300 includes incrementing the present value of the antenna element counter variable. For example, if the present value of the antenna element counter variable is equal to one, the antenna element counter variable can be incremented to have a present value of two. After the antenna element counter variable is incremented at (314), the method reverts to (308). It should be appreciated that multiple iterations of steps (308)-(314) are performed until the present value of the antenna element counter variable is equal to or greater than the total number of antenna elements included in the antenna system. However, once the present value of the antenna element counter variable equals or exceeds the total number antenna elements, the method 300 proceeds to (316).

At (316), the method 300 includes generating configuration data for the tuner based, at least in part, on the one or more metrics obtained at (308). In example embodiments, the controller can compare the one or more metrics obtained for each antenna element against one another to generate the configuration data for the tuner. For example, if the one or more metrics obtained for a first antenna element are better compared to the one or more metrics obtained for every other antenna element, then the controller can generate configuration data linking the first channel to the first antenna element. At (318), the method includes storing the configuration data. In example embodiments, configuration data can be stored in one or more memory devices associated with the controller of the antenna system. It should be appreciated, however, that the configuration data can be stored at any suitable location.

At (320), the method 300 includes comparing the present value of the channel counter0 counter variable (n) against a total number of channels (N). For instance, if the present value of the channel counter variable is less than the total number of channels, then the method proceeds to (322). Otherwise, the method 300 may terminate at (324).

At (322), the method 300 includes incrementing the present value of the channel counter variable. For example, if the present value of the antenna element counter variable is equal to one, the antenna element counter variable can be incremented to have a present value of two. After the channel element counter variable is incremented at (322), the method 300 reverts to (304). It should be appreciated that multiple iterations of steps (304)-(322) are performed until the present value of the channel counter variable is equal to greater than the total number of channels. Once the present value of the channel counter variable is equal to or greater than the total number antenna elements, the method 300 proceeds to (324) and terminates.

Figure 7:
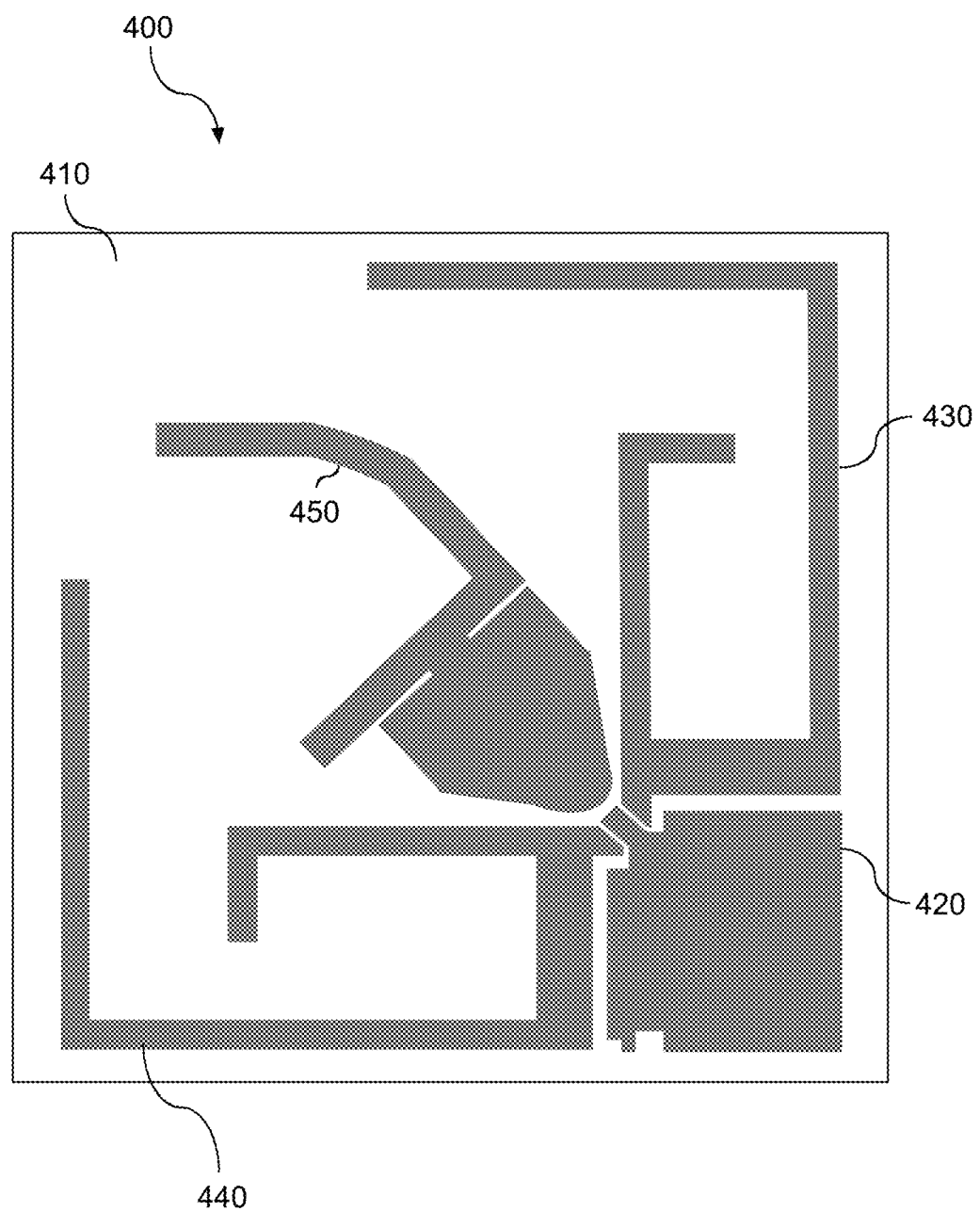
FIG. 7 depicts a schematic view of an active antenna according to example embodiments of the present disclosure.

Referring now to FIG. 7, a schematic of an antenna 400 is provided according to example embodiments of the present disclosure. As shown, the antenna 400 includes a substrate 410 and a ground plane 420 formed on the substrate 410. In some implementations, the antenna 400 includes a first antenna element 430, a second antenna element 440, and a third antenna element 450. It should be appreciated, however, that the antenna 400 can include more or fewer antenna elements. It should also be appreciated that each of the first antenna element 430, the second antenna element 440, and the third antenna element 450 can, in some implementations, be positioned on the substrate 410 adjacent the ground plane 420.

In example embodiments, the first antenna element 430 can have a horizontal polarization. Alternatively and/or additionally, the first antenna element 430 can be configured to receive a RF signal associated with a UHF band or a VHF band. In example embodiments, the second antenna element 440 can have a vertical polarization. Alternatively and/or additionally, the second antenna element 440 can be configured to receive a RF signal associated with the UHF band or the VHF band. In example embodiments, the third antenna element 450 can have a slant polarization relative to the horizontal polarization of the first antenna element 430 and the vertical polarization of the second antenna element 440. In some implementations, the slant polarization can span from about negative 45 degrees to positive 45 degrees. It should be appreciated, however, that the slant polarization can span any suitable range of angles. Alternatively and/or additionally, the third antenna element 450 can be configured to receive a RF signal associated with the UHF band or the VHF band.

Figure 8:
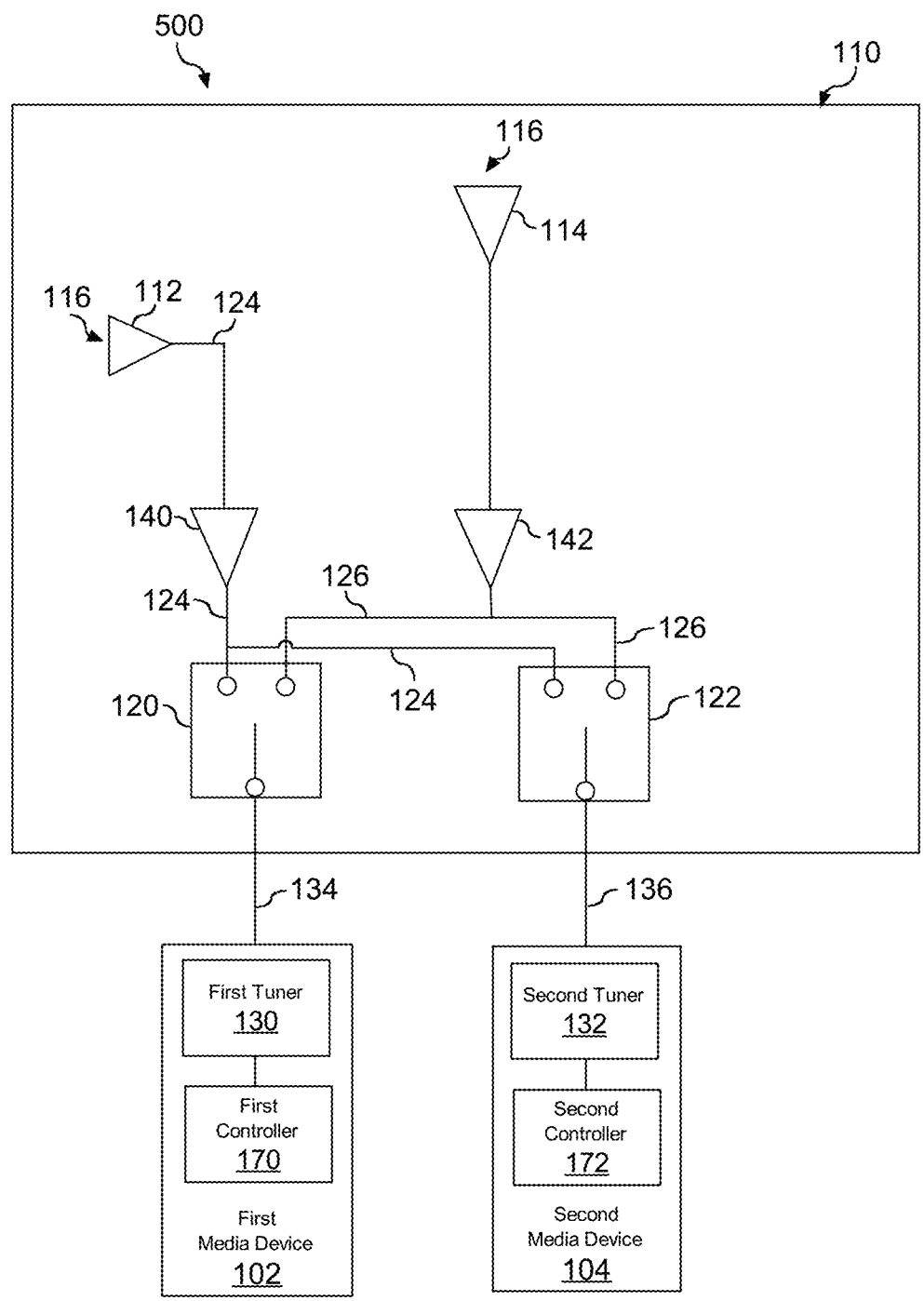
FIG. 8 depicts another antenna system according to example embodiments of the embodiments of the present disclosure.

Referring now to FIG. 8, another embodiment of an antenna system 500 is provided according to example embodiments of the present disclosure. It should be appreciated that the antenna system 500 of FIG. 8 can be configured in substantially the same manner as the antenna system 100 discussed above with reference to FIGS. 1 through 3. For instance, the antenna system 500 of FIG. 8 can include a first antenna element 112 and a second antenna element 114. However, in contrast to the antenna system 100 depicted in FIGS. 1 through 3, the first tuner 130 of the antenna system 500 depicted in FIG. 8 can be associated with the first media device 102. In addition, the antenna system 500 can include a first controller 170 associated with the first media device 102. It should be appreciated that the first controller 170 can be configured in substantially the same manner as the controller 160 discussed above with reference to FIG. 4. In some implementations, the first tuner 130 and the first controller 170 can, as shown, be included onboard the first media device 102. In alternative implementations, the first tuner 130 and the first controller 170 can be included onboard a set top box (not shown) that is communicatively coupled to the first media device 102 via any suitable wired (e.g., coaxial cable) or wireless communication link.

Additionally, the second tuner 132 of the antenna system 500 can be associated with the second media device 104. In addition, the antenna system 500 can include a second controller 172 associated with the second media device 104. It should be appreciated that the second controller 172 can be configured in substantially the same manner as the controller 160 discussed above with reference to FIG. 4. In some implementations, the second tuner 132 and the second controller 172 can, as shown, be included onboard the second media device 104. In alternative implementations, the second tuner 132 and the second controller 172 can be included onboard a set top box (not shown) that is communicatively coupled to the second media device 104 via any suitable wired (e.g., coaxial cable) or wireless communication link.

Figure 9:
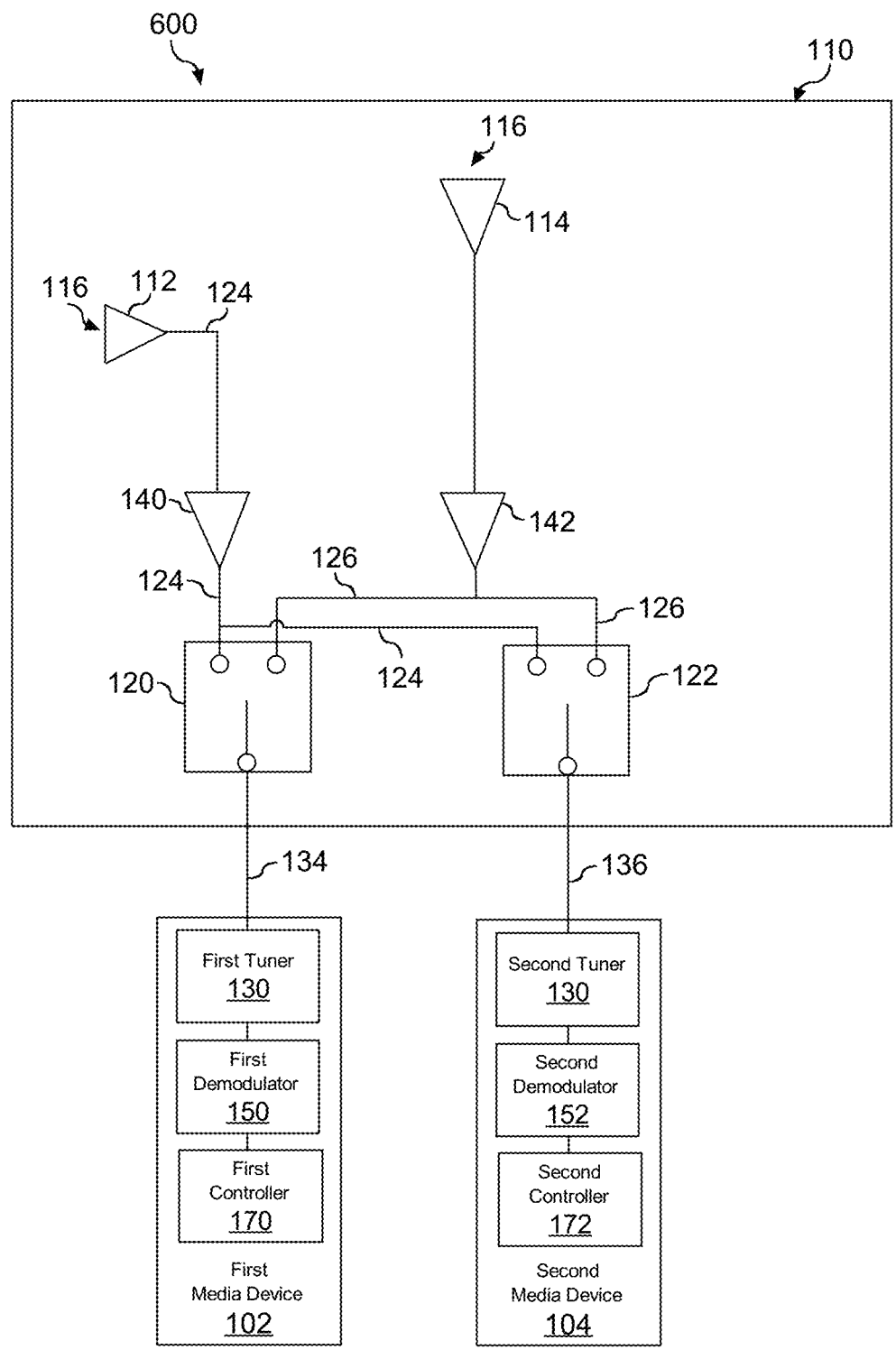
FIG. 9 depicts yet another antenna system according to example embodiments of the present disclosure.

Referring now to FIG. 9, yet another embodiment of an antenna system 600 is provided according to example embodiments of the present disclosure. It should be appreciated that the antenna system 600 of FIG. 9 can be configured in substantially the same manner as the antenna system 500 discussed above with reference to FIG. 8. For instance, the antenna system 600 of FIG. 9 can include a first antenna element 112 and a second antenna element 114. However, in contrast to the antenna system 500 depicted in FIG. 8, the antenna system 600 of FIG. 9 can include a first demodulator 150 associated with the first media device 102. In some implementations, the first tuner 130, the first demodulator 150, and the first controller 170 can, as shown, be included onboard the first media device 102. In alternative implementations, the first tuner 130, the first demodulator 150, and the first controller 170 can be included onboard a set-top box (not shown) that is communicatively coupled to the first media device 102 via any suitable wired (e.g., coaxial cable) communication link.

Additionally, the antenna system 600 of FIG. 9 can include a second demodulator 152 associated with the second media device 104. In some implementations, the second demodulator 152 can be included onboard the second media device 104. In alternative implementations, the second tuner 132, the second demodulator 152, and the second controller 172 can, as shown, be included onboard the second media device 104. In alternative implementations, the second tuner 132, the second demodulator 152, and the second controller 172 can be included onboard a set-top box (not shown) that is communicatively coupled to the second media device 104 via any suitable wired (e.g., coaxial cable) or wireless communication link.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. An antenna system for use with one or more media devices, the antenna system comprising:
    a plurality of antenna elements, each of the plurality of antenna elements associated with an independent feed element, each of the plurality of antenna elements configured to receive a plurality of radio frequency (RF) signals, each of the plurality of RF signals associated with a UHF band or a VHF band;
    at least one tuner;
    at least one switching device; and
    a controller configured to:
        adjust each tuner of the at least one tuner to a first television channel of a plurality of television channels, the first television channel associated with a first RF signal of the plurality of RF signals;
        couple the tuner to each antenna element of the plurality of antenna elements via the at least one switching device while the tuner is adjusted to the first television channel;
        obtain data indicative of performance of each antenna element of the plurality of antenna elements respective to the first television channel and the tuner while the antenna element is coupled to the tuner and while the tuner is adjusted to the first television channel via the at least one switching device;
        select one of the plurality of antenna elements as a selected antenna element for the first television channel based, at least in part, on the data indicative of performance of each of the plurality of antenna elements while the tuner is adjusted to the first television channel;
        generate configuration data linking the first television channel to the selected antenna element respective to the tuner; and
        store the configuration data linking the first television channel to the selected antenna element respective to the tuner.

2. The antenna system of claim 1, wherein the plurality of antenna elements comprise:
    a first antenna element associated with a first antenna polarization; and
    a second antenna element associated with a second antenna polarization, the second antenna polarization being different than the first antenna polarization.

3. The antenna system of claim 2, wherein:
    the first antenna polarization comprises a horizontal antenna polarization; and
    the second antenna polarization comprises a vertical antenna polarization.

4. The antenna system of claim 1, wherein the at least one tuner and the plurality of antenna elements are disposed within a singular package.

5. The antenna system of claim 1, wherein the at least one tuner is couplable to the one or more media devices via a wired or wireless communication link.

6. The antenna system of claim 1, wherein the configuration data comprises a lookup table.

7. The antenna system of claim 1, wherein the data indicative of performance of each of the plurality of antenna elements while coupled to the at least one tuner via the at least one switching device comprises at least one of a received signal strength indicator (RSSI), a signal to noise ratio (SNR), and a signal-to-interference plus noise ratio (SINR).

8. The antenna system of claim 1, wherein the controller is further configured to:
    store the configuration data in one or more memory devices.

9. The antenna system of claim 1, wherein the controller is further configured to:
    adjust the at least one tuner to a second television channel of a plurality of television channels, the second television channel associated with a first RF signal of the plurality of RF signals;
    couple the at least one tuner to each of the plurality of antenna elements via the at least one switching device while the at least one tuner is adjusted to the second television channel;
    obtain data indicative of performance of each of the plurality of antenna elements while coupled to the at least one tuner when the at least one tuner is adjusted to the second television channel;
    select the antenna element for the second television channel based, at least in part, on the data indicative of performance of each of the plurality of antenna elements; and
    generate configuration data based, at least in part, on the data indicative of performance of each of the plurality of antenna elements, the configuration data linking the second television channel to an antenna element of the plurality of antenna elements the selected antenna element for the second television channel.

10. The antenna system of claim 9, wherein the selected antenna element linked with the first television channel is different than the selected antenna element linked with the second television channel.

11. A method of configuring an antenna system for use with one or more media devices, the antenna system comprising a plurality of antenna elements, each antenna element configured to receive a plurality of RF signals in a UHF band or a VHF band, the method comprising:
- obtaining, by a controller of the antenna system, channel selection data associated with a first tuner, the channel selection data indicating selection of a first television channel of a plurality of television channels, the first television channel associated with a first RF signal of the plurality of RF signals received via the plurality of antenna elements;
- obtaining, by the controller, configuration data for the first tuner, the configuration data linking the first television channel with an antenna element of the plurality of antenna elements for receiving the first television channel at the first tuner; and
- coupling, by the controller, the first tuner to the antenna element linked with the first television channel for the first tuner according to the configuration data.

12. The method of claim 11, wherein obtaining configuration data comprises:
- adjusting, by the controller, the first tuner to the first television channel;
- coupling, by the controller, the first tuner to each of the plurality of antenna elements while the first tuner is tuned to the first television channel;
- obtaining, by the controller, data indicative of performance of each of the plurality of antenna elements while coupled to the first tuner;
- selecting one of the plurality of antenna elements as the antenna element for the first television channel based, at least in part, on the data indicative of performance of each of the plurality of antenna elements; and
- generating, by the controller, the configuration data linking the antenna element with the first television channel.

13. The method of claim 11, wherein obtaining configuration data comprises accessing, by the controller, the configuration data from one or more memory devices associated with the controller.

14. The method of claim 11, further comprising:
- obtaining, by the controller, channel selection data associated with a second tuner, the channel selection data indicating selection of a second television channel of the plurality of television channels, the second television channel associated with a second RF signal of the plurality of RF signals received via the plurality of antenna elements;
- obtaining, by the controller, configuration data for the second tuner, the configuration data for the second tuner linking each television channel of the plurality of television channels to the second television channel with an antenna element of the plurality of antenna elements; and
- coupling, by the controller, the second tuner to the antenna element linked with the second television channel according to the configuration data for the second tuner.

15. The method of claim 14, wherein the antenna element coupled to the second tuner is different than the antenna element coupled to the first tuner.

16. The method of claim 14, wherein the first tuner is coupled to a first media device via a wired or wireless communication link.

17. The method of claim 14, wherein the second tuner is coupled to a second media device via a wired or wireless communication link.

18. The method of claim 14, wherein obtaining configuration data for the second tuner comprises:
- adjusting, by the controller, the second tuner to the second television channel;
- coupling, by the controller, the second tuner to each of the plurality of antenna elements while the second tuner is tuned to the second television channel;
- obtaining, by the controller, data indicative of performance of each of the plurality of antenna elements while coupled to the second tuner;
- selecting one of the plurality of antenna elements as the antenna element for the second television channel based, at least in part, on the data indicative of performance of each of the plurality of antenna elements; and
- generating, by the controller, the configuration data linking the antenna element with the second television channel.

19. The method of claim 14, wherein the configuration data for the second tuner is different than the configuration data for the first tuner.

* * * * *